United States Patent
Singh et al.

(10) Patent No.: US 11,623,764 B2
(45) Date of Patent: Apr. 11, 2023

(54) MOVEABLE MOUNTING STRUCTURE FOR UAV

(71) Applicant: Ford Global Technologies, LLC, Dearborn, MI (US)

(72) Inventors: Aditya Singh, Dearborn, MI (US); James Carthew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 16/959,685

(22) PCT Filed: Jan. 10, 2018

(86) PCT No.: PCT/US2018/013158
§ 371 (c)(1),
(2) Date: Jul. 2, 2020

(87) PCT Pub. No.: WO2019/139574
PCT Pub. Date: Jul. 18, 2019

(65) Prior Publication Data
US 2020/0407077 A1    Dec. 31, 2020

(51) Int. Cl.
| | |
|---|---|
| *B64D 47/08* | (2006.01) |
| *B64C 19/00* | (2006.01) |
| *B64C 39/02* | (2023.01) |
| *G05D 1/00* | (2006.01) |
| *G05D 1/10* | (2006.01) |

(Continued)

(52) U.S. Cl.
CPC .............. *B64D 47/08* (2013.01); *B64C 19/00* (2013.01); *B64C 39/02* (2013.01); *G05D 1/0094* (2013.01); *G05D 1/101* (2013.01); *B64U 10/13* (2023.01); *B64U 70/00* (2023.01);

(Continued)

(58) Field of Classification Search
CPC ......... B64D 47/08; B64C 19/00; B64C 39/02; B64C 2201/027; B64C 2201/123; B64C 2201/127; B64C 2201/141; B64C 2201/18; B64C 39/024; G05D 1/0094; G05D 1/101; G05D 2201/0207; B64U 70/00;

(Continued)

(56) References Cited

U.S. PATENT DOCUMENTS

| | | | |
|---|---|---|---|
| 9,057,609 B2 | 6/2015 | Yu et al. | |
| 10,189,580 B2 * | 1/2019 | Lorell | .................... F16M 13/02 |

(Continued)

FOREIGN PATENT DOCUMENTS

| | | | |
|---|---|---|---|
| KR | 200472290 Y1 | 4/2014 | |
| WO | WO-2017141154 A1 * | 8/2017 | ........... B64C 39/024 |

OTHER PUBLICATIONS

International Search Report of the International Searching Authority for PCT/US2018/013158 dated Mar. 26, 2018.

*Primary Examiner* — Anne Marie Antonucci
*Assistant Examiner* — Connor L Knight
(74) *Attorney, Agent, or Firm* — Brandon Hicks; Eversheds Sutherland (US) LLP

(57) ABSTRACT

Example moveable mounting structures and methods are described. In one implementation, an unmanned aerial vehicle (UAV) includes a body and a moveable mounting structure coupled to the body. The moveable mounting structure can move between a stowed position and a deployed position without interfering with a payload carried by the UAV. A camera is mounted to the moveable mounting structure.

13 Claims, 8 Drawing Sheets

(51) Int. Cl.
  *B64U 10/13* (2023.01)
  *B64U 70/00* (2023.01)
  *B64U 101/30* (2023.01)

(52) U.S. Cl.
  CPC ...... *B64U 2101/30* (2023.01); *B64U 2201/10* (2023.01); *G05D 2201/0207* (2013.01)

(58) Field of Classification Search
  CPC ............ B64U 2101/30; B64U 2201/10; G03B 17/561; G03B 15/006
  See application file for complete search history.

(56) References Cited

U.S. PATENT DOCUMENTS

| | | | |
|---|---|---|---|
| 2011/0290937 | A1 | 12/2011 | Salkeld |
| 2013/0193269 | A1* | 8/2013 | Zwaan ................... B64D 47/08 244/118.1 |
| 2014/0032034 | A1 | 1/2014 | Raptopoulos et al. |
| 2014/0034776 | A1* | 2/2014 | Hutson ................. B64C 39/024 244/17.17 |
| 2014/0236391 | A1* | 8/2014 | Wood ................. H04B 7/18506 701/2 |
| 2016/0068264 | A1 | 3/2016 | Ganesh et al. |
| 2017/0293795 | A1 | 10/2017 | Okada |
| 2018/0312252 | A1* | 11/2018 | Yates ........................ B64C 3/56 |
| 2019/0004512 | A1* | 1/2019 | Liu ........................ H04N 5/247 |
| 2019/0163206 | A1* | 5/2019 | Zhu ........................ G06V 20/13 |
| 2019/0202560 | A1* | 7/2019 | Bosworth ............ B25J 15/0213 |
| 2020/0391878 | A1* | 12/2020 | Woodman ............... B64C 25/54 |

* cited by examiner

MOVEABLE MOUNTING STRUCTURE FOR UAV

TECHNICAL FIELD

The present disclosure relates to a moveable mounting structure for an unmanned aerial vehicle (UAV) and a system for controlling movement of the mounting structure.

BACKGROUND

Landing an unmanned aerial vehicle (UAV) at a specific location can be difficult. Precise landing locations can be hindered by turbulence generated by the air displaced by the UAV's propellers and reflected by the landing surface. A camera mounted to the UAV can assist with landing by capturing images of the landing location. These images are used to maneuver the UAV and keep the UAV aligned with the desired landing location. To best capture images of the landing location, the camera is often located on the bottom of the UAV so that the field of view of the camera is directly below the UAV. However, this may cause problems with the camera's ability to capture images of the landing area because objects carried by the UAV may block the camera. Additionally, a camera mounted below the UAV may interfere with the loading and unloading of objects carried by the UAV.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
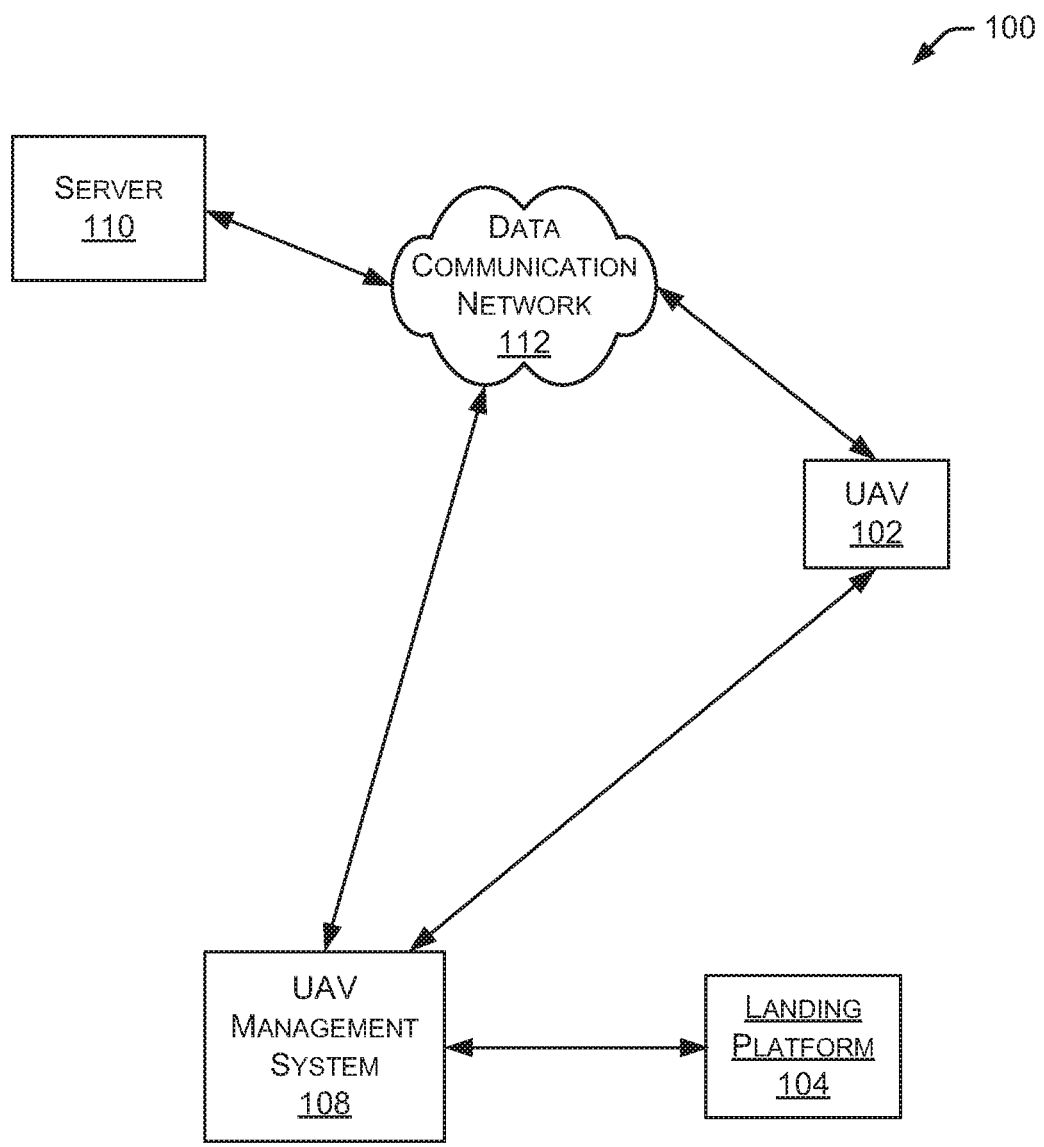
FIG. 1 is a block diagram depicting an environment within which an example embodiment may be implemented.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram depicting an environment 100 within which an example embodiment may be implemented. An unmanned aerial vehicle (UAV) 102 may land on, and take off from, a landing platform 104 or any other landing surface, landing area, landing location, and the like. In some embodiments landing platform 104 is mounted to a vehicle (e.g., mounted to the roof of a vehicle), a building, loading dock, loading platform, or any other device or structure. UAV 102 can be any type of unmanned aerial vehicle capable of maneuvering to land on, and take off from, any type of landing platform or landing area. In some embodiments, UAV 102 is a multicopter having two or more rotors (e.g., motors) and associated propellers. In particular implementations, UAV 102 has a single rotor and associated propeller. UAV 102 may also be referred to as a drone or a remotely piloted aircraft. In some embodiments, landing platform 104 provides a temporary location for UAV 102 to land and receive payload, deliver payload, recharge, "piggy back" on a vehicle, and the like.

As shown in FIG. 1, a UAV management system 108 is capable of wirelessly communicating with UAV 102. Any communication protocol may be used for communications between UAV management system 108 and UAV 102, such as 3G, 4G LTE, WiFi, and the like. In some embodiments, UAV management system 108 provides flight guidance to UAV 102 when landing on, or taking off from, landing platform 104. In some implementations, UAV management system 108 communicates with a server 110 via a data communication network 112. For example, UAV management system 108 may communicate data associated with UAV 102, payload, and the like to server 110. Additionally, UAV management system 108 may receive data from server 110 associated with UAV 102, payload delivery instructions, and the like. Other types of data received by UAV management system 108 may include a calculated flight path for UAV 102, temporary flight restrictions, airspace flight restrictions, and localized models of obstructions near the delivery or in the flight path of UAV 102. Data communication network 112 includes any type of network topology using any communication protocol. Additionally, data communication network 112 may include a combination of two or more communication networks. In some embodiments, data communication network 112 includes a cellular communication network, the Internet, a local area network, a wide area network, or any other communication network.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
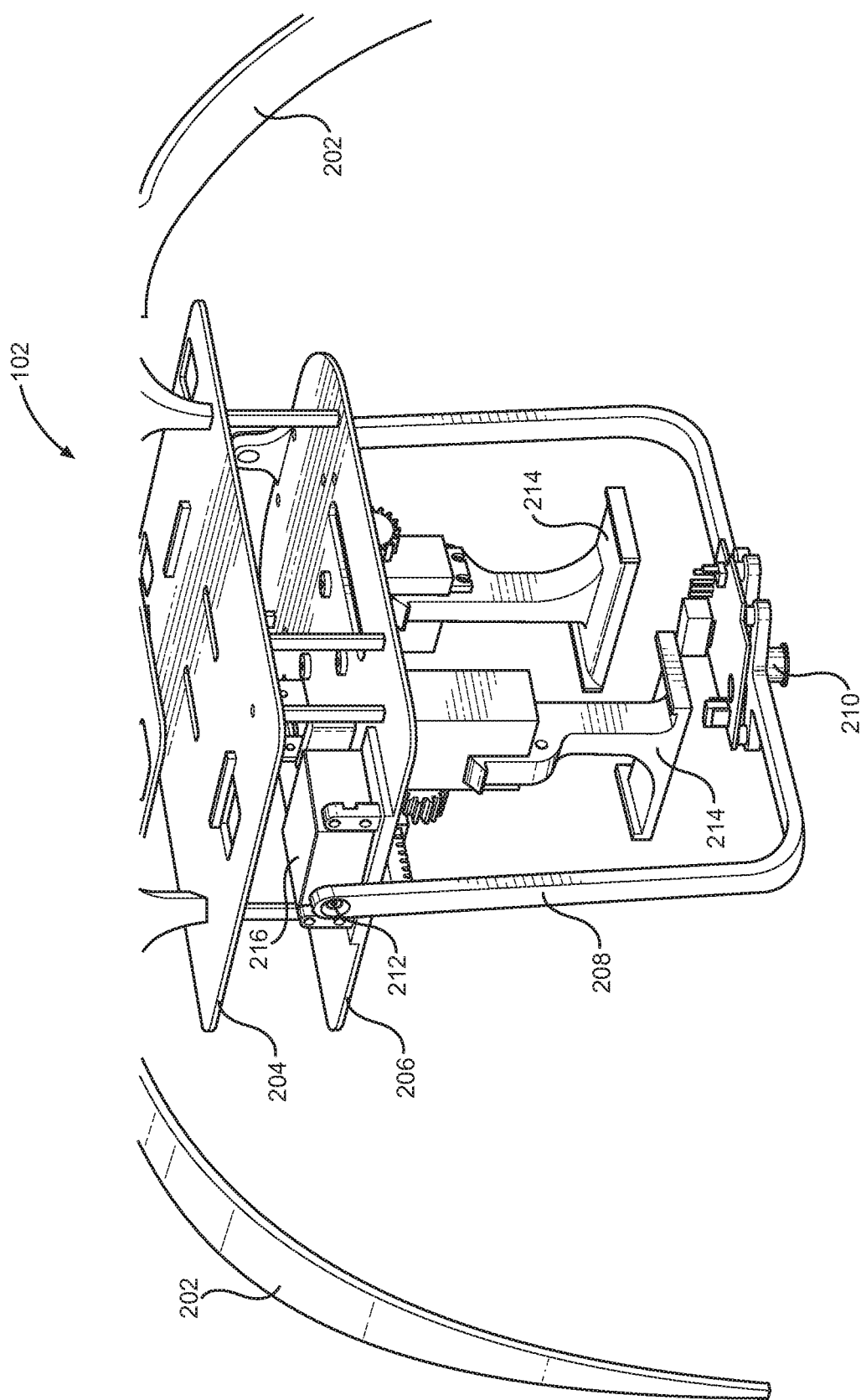
FIG. 2 illustrates an embodiment of a UAV with a moveable mounting structure in a deployed position.
Figure 3:
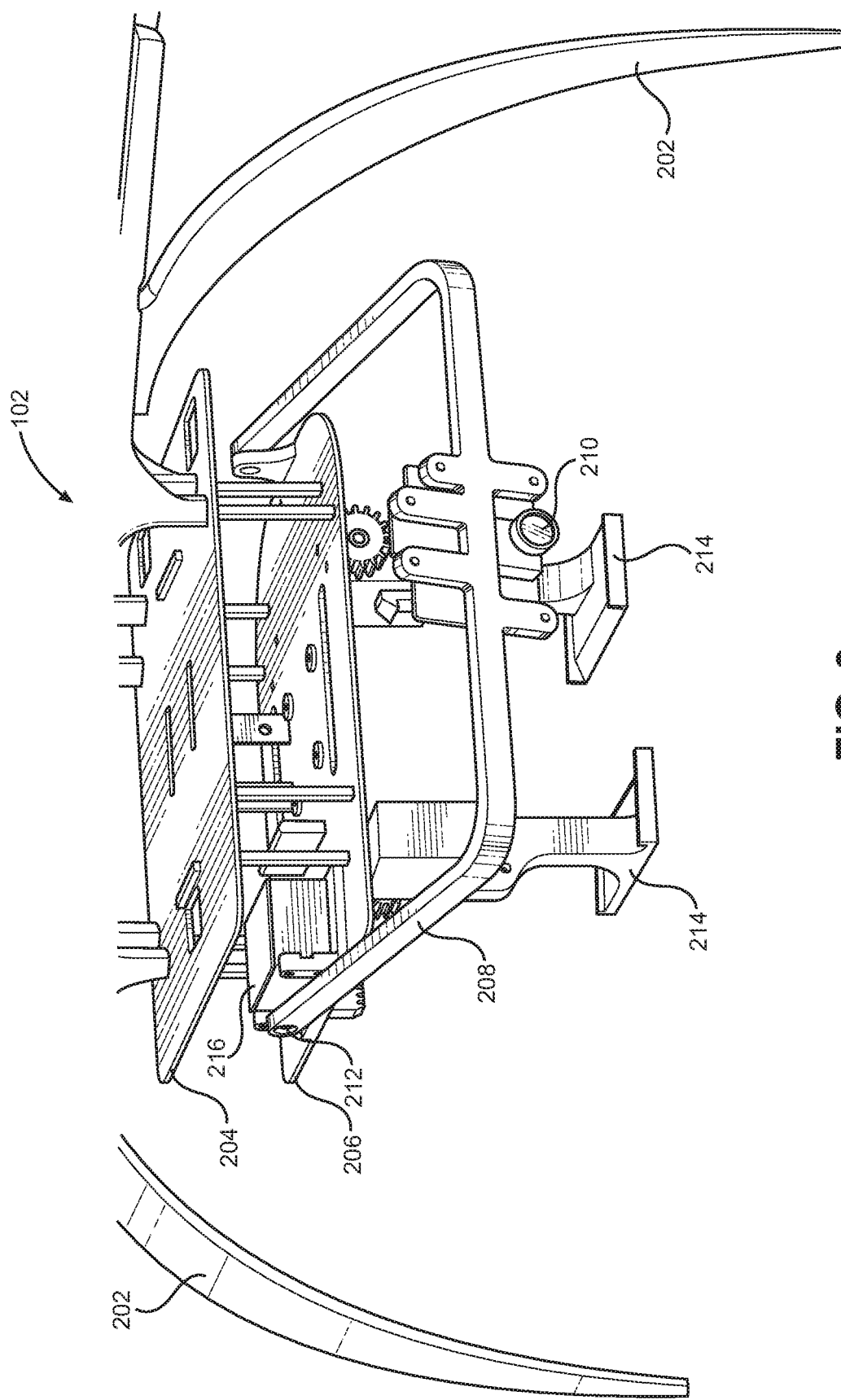
FIG. 3 illustrates an embodiment of a UAV with the moveable mounting structure in a stowed position.

FIG. 2 illustrates an embodiment of UAV 102 with a moveable mounting structure 208 in a deployed position. The example of FIG. 2 only shows a portion of UAV 102. Some portions of UAV 102 are now shown in FIG. 2 for improved illustration and explanation of specific components or structure associated with moveable mounting structure 208. For example, certain housing components and other structures are not shown in FIG. 2 since they might obstruct the view of moveable mounting structure 208 and its mounting and movement components. As discussed herein, moveable mounting structure 208 is capable of moving (e.g., rotating) between a deployed position (as shown in FIG. 2) and a stowed position (as shown in FIG. 3). The deployed position may also be referred to as an "extended position" and the stowed position may also be referred to as a "retracted position." In some embodiments, the rotational difference between the deployed position and the stowed position is approximately 90 degrees. In other embodiments, moveable mounting structure 208 may be configured to rotate through any range, including rotation of more than 90 degrees or less than 90 degrees. In some embodiments, mounting structure 208 is made from any stable plastic (e.g., ABS or PVA) or from fiber/resin materials, such as fiberglass or carbon fiber. In other embodiments, a metal such as aluminum may be used to manufacture mounting structure 208.

UAV 102 includes multiple legs 202 that support UAV 102 on a landing platform or other landing surface. One or more body components (also referred to as "structural components"), such as mounting plates 204 and 206, support different components, devices and/or systems associated with UAV 102. In other embodiments, mounting plates 204, 206 may be replaced with different types of body components or support structures, such as a chassis, a body structural component, and the like. Particular embodiments of UAV 102 may include any number of mounting plates 204, 206 and other mounting structures, mounting platforms, support structures, housings, and the like. As mentioned above, moveable mounting structure 208 is mounted to UAV 102 such that moveable mounting structure 208 can move (e.g., rotate or pivot) between a deployed position (shown in FIG. 2) and a stowed position (shown in FIG. 3). Moveable mounting structure 208 is mounted to UAV 102 at a pivot point 212 adjacent a motor 216. A corresponding pivot point is located on the opposite side of UAV 102 where the opposite side of moveable mounting structure 208 is pivotally attached to mounting plate 206. Operation of motor 216 causes a rotation of a motor drive shaft that connects to moveable mounting structure 208 at pivot point 212. Rotation of the motor drive shaft causes movement (e.g., rotation) of moveable mounting structure 208. In some embodiments, motor 216 may include a servo motor, a stepper motor, a geared DC motor with an encoder, and the like.

A camera 210 is attached to moveable mounting structure 208 as shown in FIG. 2. Camera 210 includes any type of camera, such as an RGB (Red Green Blue) camera, an IR (Infrared) camera, and the like. When moveable mounting structure 208 is in the deployed position of FIG. 2, camera 210 is facing downward and captures images of areas below UAV 102. This orientation is particularly useful when UAV 102 is landing or taking off since it provides images of the landing area and allows UAV 102 to land at a desired location. As moveable mounting structure 208 is moved from the deployed position to the stowed position (FIG. 3), the view of camera 210 changes based on the changing rotational angle of moveable mounting structure 208. In some embodiments, legs 202 of UAV 102 are of sufficient length that camera 210 does not touch the landing surface (or landing platform) when moveable mounting structure 208 is in the deployed position.

As shown in FIG. 2, UAV 102 includes multiple payload support structures 214 (e.g., pinion rack graspers) that can attach to and/or grasp a payload object (not shown) such that UAV 102 can transport the payload object to another location. The area in which payload objects are secured by UAV 102 may be referred to as a "payload area." Moveable mounting structure 208 moves between the deployed position and the stowed position without entering or interfering with the payload area associated with UAV 102. As shown in FIG. 2, moveable mounting structure 208 partially surrounds the payload area associated with UAV 102. Thus, moveable mounting structure 208 can move between the deployed position and the stowed position without touching payload carried by UAV 102.

In some embodiments, moveable mounting structure 208 is in the deployed position as shown in FIG. 2 when UAV 102 is landing. In this position, camera 210 provides images of the landing area, which allows UAV 102 to successfully maneuver and land at a desired location. After UAV 102 lands in the landing area, moveable mounting structure 208 is moved to the stowed position which allows access to the bottom of UAV 102 for loading/unloading payload, connecting with recharging systems, and the like. Since UAV 102 has landed, camera 210 is no longer needed and moving moveable mounting structure 208 to the stowed position does not interfere with drone activity. After the servicing of UAV 102 (loading/unloading payload, connecting with recharging systems, etc.) is finished, moveable mounting structure 208 is moved back to the deployed position so that camera 210 is in position to capture images as UAV 102 takes off from the landing area. As mentioned herein, moveable mounting structure 208 has a shape and position that does not contact any payload mounted to UAV 102 when moveable mounting structure 208 moves between the deployed position and the stowed position.

FIG. 3 illustrates an embodiment of UAV 102 with moveable mounting structure 208 in the stowed position. As discussed herein, with moveable mounting structure 208 in the stowed position, the bottom of UAV 102 is accessible for loading payload, unloading payload, connecting a recharging system to recharge one or more batteries in UAV 102, and the like.

Figure 4:
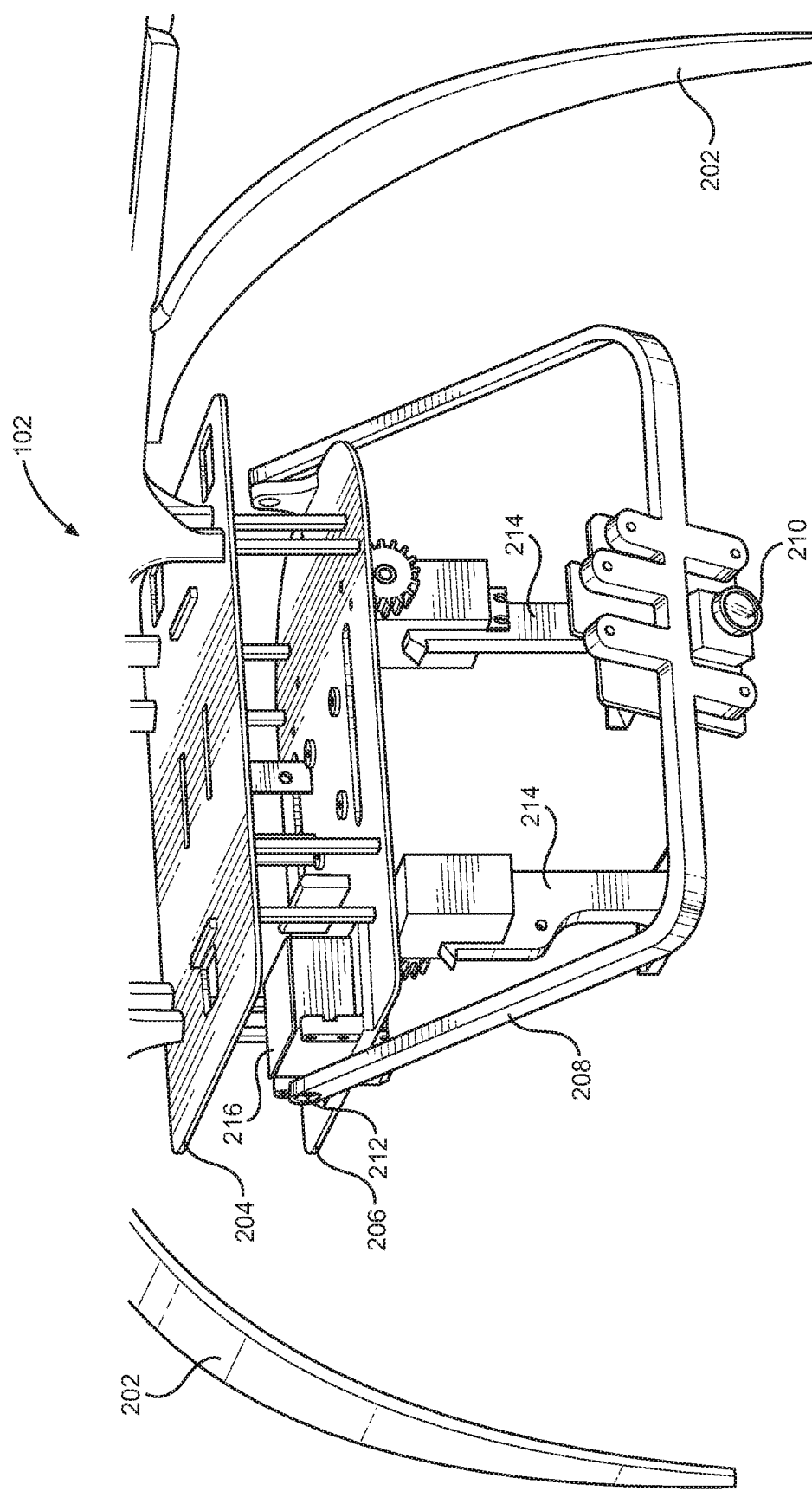
FIG. 4 illustrates an embodiment of a UAV with the moveable mounting structure between the deployed position and the stowed position.

FIG. 4 illustrates an embodiment of UAV 102 with moveable mounting structure 208 rotated between the deployed position and the stowed position. Moveable mounting structure 208 can be moved to any point (e.g., any rotational angle) between the deployed position and the stowed position. This is accomplished by stopping the operation of motor 216 at the desired point. Additionally, the position of moveable mounting structure 208 can be adjusted during the flight of UAV 102, for example, to adjust the images captured by camera 210. In some embodiments, UAV 102 may capture images of a particular area while in flight. As the location of UAV 102 changes (e.g., lateral location, altitude, etc.), the position of moveable mounting structure 208 is adjusted to keep camera 210 focused on the particular area. Additionally, the axis of UAV 102 may be changed to adjust the orientation (or field of view) of camera 210. In particular implementations, UAV management system 108 and/or control systems within UAV 102 may work individually or together to position UAV 102 and moveable mounting structure 208 such that camera 210 remains focused on the particular area.

UAV 102 illustrated in FIGS. 2-4 includes one example of moveable mounting structure 208. In other embodiments, moveable mounting structure 208 can have any shape, be mounted in any location on UAV 102, move in any direction with any number of pivot points, and the like. For example, moveable mounting structure 208 may have an "L" shape instead of the "U" shape shown in FIGS. 2-4. In some implementations, moveable mounting structure 208 may have two separate "L" shaped structures that each pivot independently of one another and are each driven by a separate motor 216. In other examples, moveable mounting structure 208 may swing outwardly from the payload area instead of rotating around the payload area. In some embodiments, the orientation of payload support structure 214 can be rotated from the illustrated position, such as rotated by 90 degrees. In particular implementations, camera 210 may be integrated into a portion of payload support structure 214 (e.g., one of the claws or arms of payload support structure 214).

In the example of FIGS. 2-4, camera 210 is mounted to moveable mounting structure 208. However, in alternate embodiments, any type of sensor or other device may be attached to moveable mounting structure 208. For example, a Lidar (Light Detection And Ranging) sensor, a Radar (Radio Detection And Ranging) sensor, an Ultrasound sensor, or an IR (Infrared) array may be mounted to moveable mounting structure 208. In some embodiments, any number of devices may be attached to moveable mounting structure 208, such as camera 210 and one or more other sensors. In particular implementations, one or more of a microphone, microphone array, RFID (Radio Frequency Identification) scanner, NFC (Near Field Communication) scanner, and the like may be attached to moveable mounting structure 208.

Figure 5:
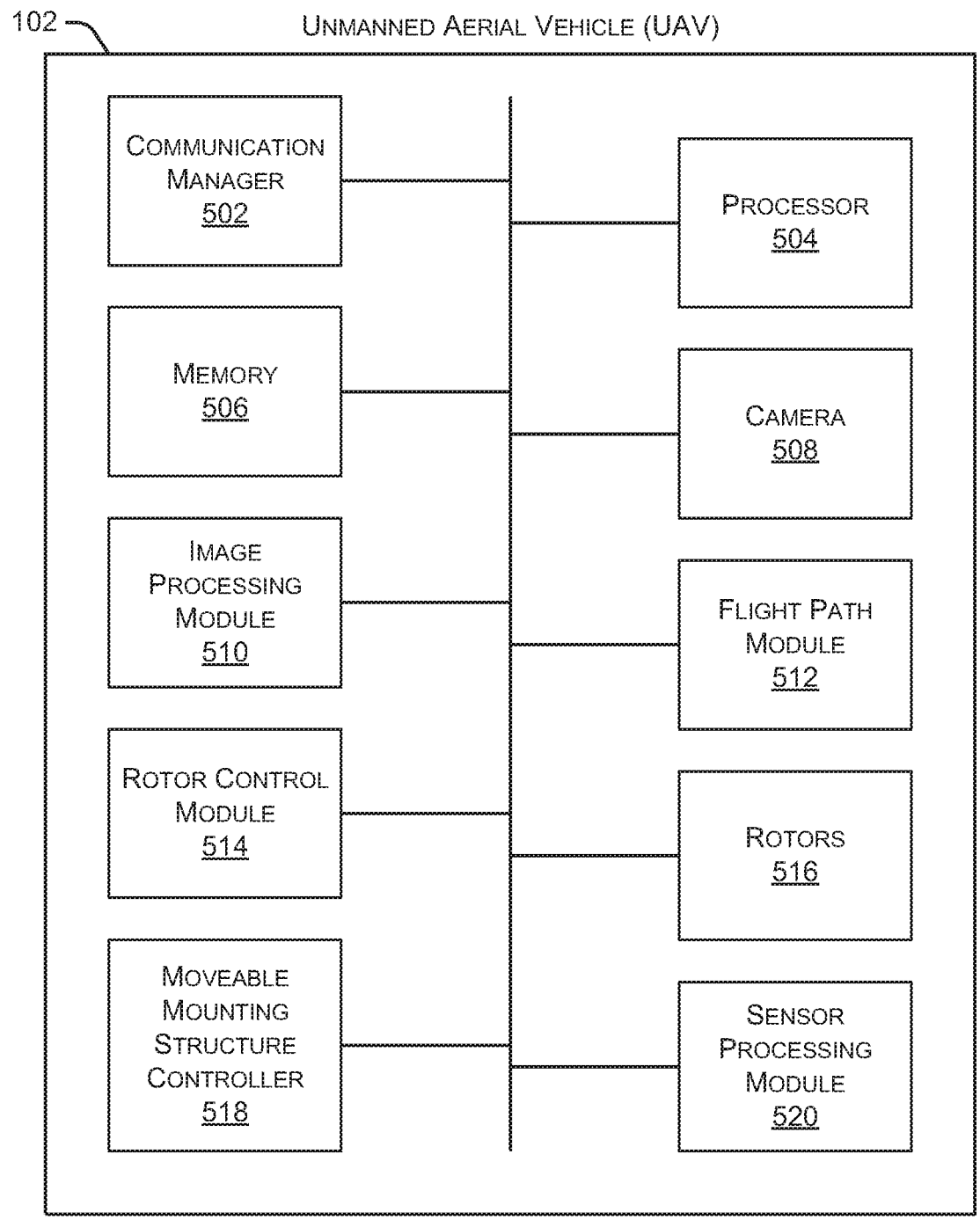
FIG. 5 is a block diagram illustrating an embodiment of an unmanned aerial vehicle.

FIG. 5 is a block diagram illustrating an embodiment of UAV 102. As shown in FIG. 5, UAV 102 includes a communication manager 502, a processor 504, and a memory 506. Communication manager 502 allows UAV 102 to communicate with other systems, such as UAV management system 108, server 110, data communication network 112, and the like. Processor 504 executes various instructions to implement the functionality provided by UAV 102, as discussed herein. Memory 506 stores these instructions as well as other data used by processor 504 and other modules and components contained in UAV 102.

UAV 102 also includes a camera 508 that captures images of the areas near UAV 102. In some embodiments, camera 508 is the same as camera 210 discussed above. In other implementations, camera 508 is different from camera 210. In some embodiments, an image processing module 510 analyzes images captured by camera 508 (or camera 210) to locate landing platforms, delivery areas, obstacles, and the like. Additionally, image processing module 510 may assist with landing UAV 102 by identifying a landing platform (or other landing area) location and determining flight adjustments needed to successfully land UAV 102 on the landing platform. A flight path module 512 generates and maintains information related to a flight path that UAV 102 attempts to follow. In some embodiments, the flight path information is received from UAV management system 108 or server 110. A rotor control module 514 controls the operation of multiple rotors 516 associated with UAV 102. In some embodiments, UAV 102 has three or four rotors 516 that assist UAV 102 in flying between multiple locations. For example, rotor control module 514 may control the rotational speed of each rotor 516 to steer and maneuver UAV 102 to a destination, such as a landing platform or delivery location. Thus, rotor control module 514 can assist in maneuvering UAV 102 along a particular flight path, avoiding obstacles, and the like. In particular embodiments, one or more of the functions performed by rotor control module 514 are, instead, performed by UAV management system 108 or server 110, which sends appropriate rotor control instructions to rotor control module 514 for implementation.

UAV 102 further includes a moveable mounting structure controller 518 that controls movement and positioning of moveable mounting structure 208. For example, moveable mounting structure controller 518 may instruct motor 216 to change the position of moveable mounting structure 208 from a stowed position to a deployed position (or vice versa) based on the current activity, status, or location of UAV 102. Additionally, moveable mounting structure controller 518 may instruct motor 216 to change the position of moveable mounting structure 208 to maintain a particular field of view for camera 210. A sensor processing module 520 receives data from one or more sensors and processes the data based on pre-programmed instructions, instructions received from UAV management system 108, instructions received from server 110, and the like. In some embodiments, sensor processing module 520 provides the received sensor data or the analyzed/processed sensor data to communication manager 502 for communication to another system or device, such as UAV management system 108 or server 110.

Figure 6:
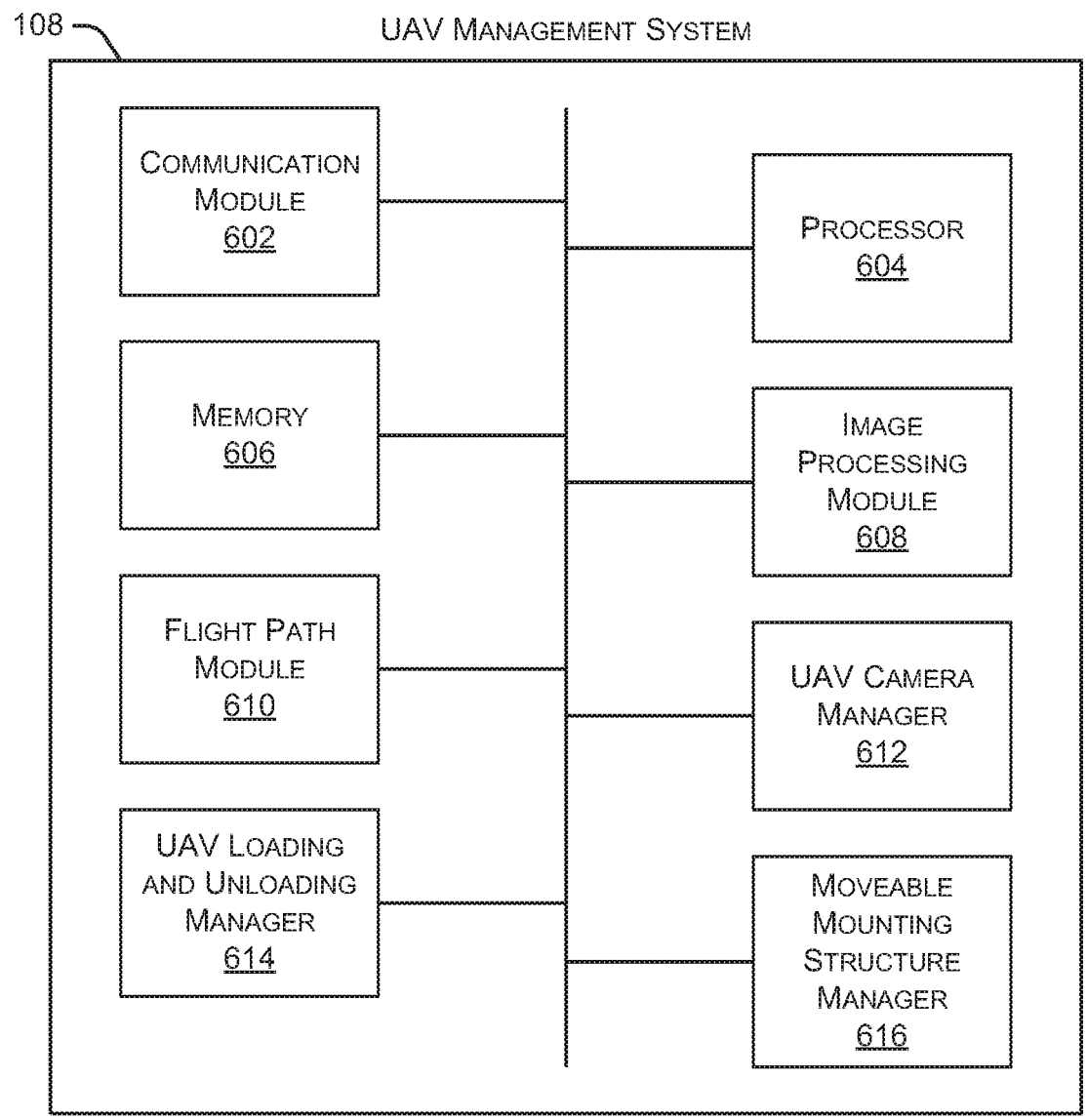
FIG. 6 is a block diagram illustrating an embodiment of a UAV management system.

FIG. 6 is a block diagram illustrating an embodiment of UAV management system 108. As shown in FIG. 6, UAV management system 108 includes a communication module 602, a processor 604, and a memory 606. Communication module 602 allows UAV management system 108 to communicate with other systems and devices, such as UAV 102, server 110, data communication network 112, and the like. Processor 604 executes various instructions to implement the functionality provided by UAV management system 108, as discussed herein. Memory 606 stores these instructions as well as other data used by processor 604 and other modules and components contained in UAV management system 108.

UAV management system 108 also includes an image processing module 608 that analyzes images captured, for example, by camera 508 or camera 210. Image processing module 608 may assist with landing UAV 102 by identifying the location and trajectory of UAV 102 with respect to a landing location, and determining flight adjustments needed to successfully land UAV 102 at the landing location. A flight path module 610 generates and maintains information related to a flight path that UAV 102 attempts to follow.

A UAV camera manager 612 manages camera 508 and/or camera 210 to capture appropriate images from either, or both, cameras 508, 210. A UAV loading and unloading manager 614 assists with the loading and unloading of payload carried by UAV 102. A moveable mounting structure manager 616 controls the movement and positioning of moveable mounting structure 208. In some embodiments, moveable mounting structure manager 616 receives commands from server 110 or other system external to UAV management system 108. In particular implementations, moveable mounting structure manager 616 receives movement commands from processor 604, image processing module 608, UAV camera manager 612, or any other component or system in UAV management system 108.

Figure 7:
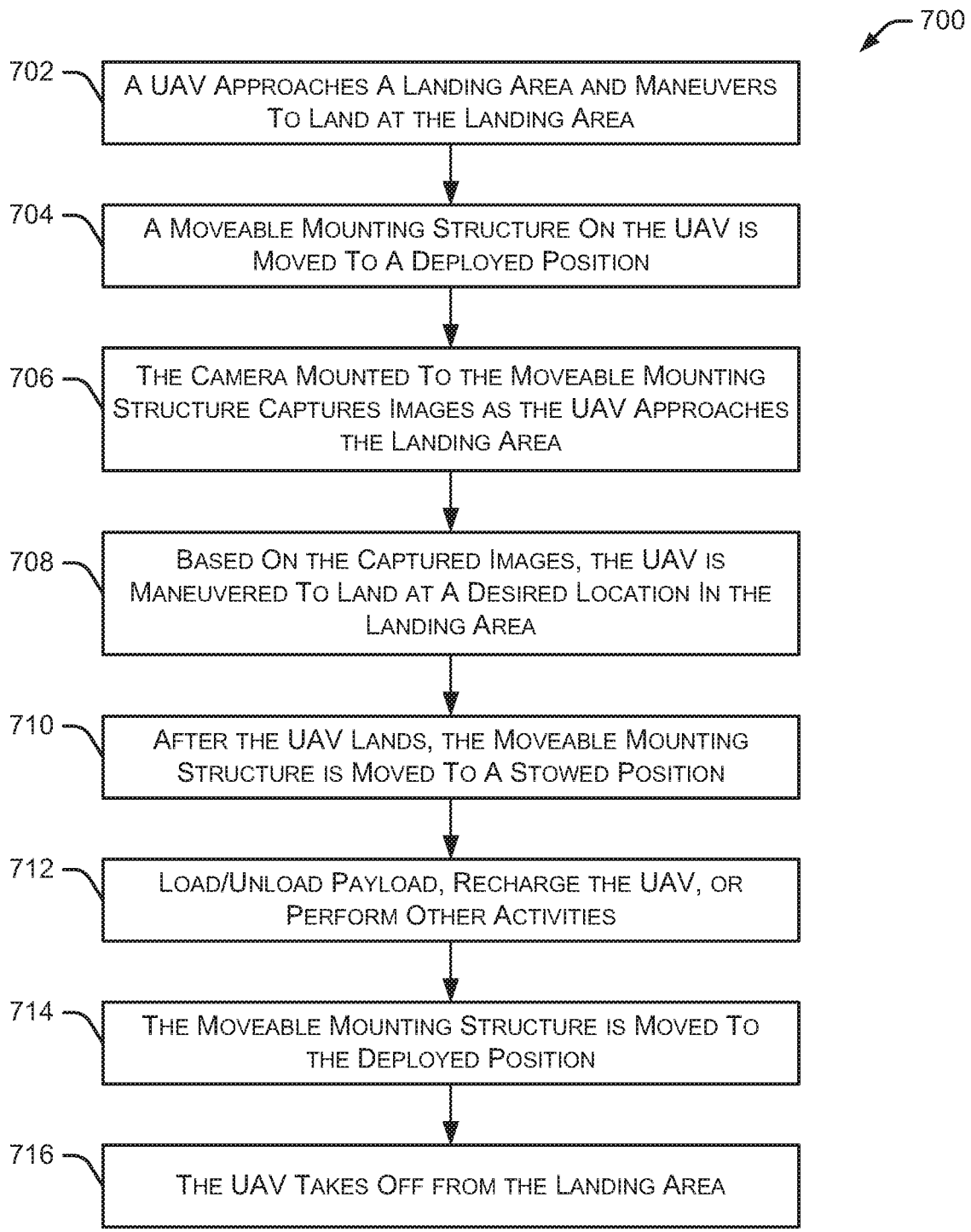
FIG. 7 is a flow diagram illustrating an embodiment of a method for operating a UAV and adjusting a moveable mounting structure associated with the UAV.

FIG. 7 is a flow diagram illustrating an embodiment of a method 700 for operating a UAV and adjusting a moveable mounting structure associated with the UAV. Initially, a UAV approaches 702 a landing area and maneuvers to land at the landing area. A moveable mounting structure on the UAV is moved 704 to a deployed position so that the camera on the moveable mounting structure can capture 706 images of the landing area to assist with the landing process. Based on the captured images, the UAV is maneuvered 708 to land at a desired location in the landing area. After the UAV lands in the landing area, the moveable mounting structure is moved 710 to a stowed position which provides easy access to the bottom of the UAV for, at 712, loading/unloading payload, attaching a charging system to the UAV, and performing other activities. When the activities are completed, the moveable mounting structure is moved 714 to the deployed position in preparation for take-off. The UAV then takes off 716 from the landing area and proceeds toward its destination.

Figure 8:
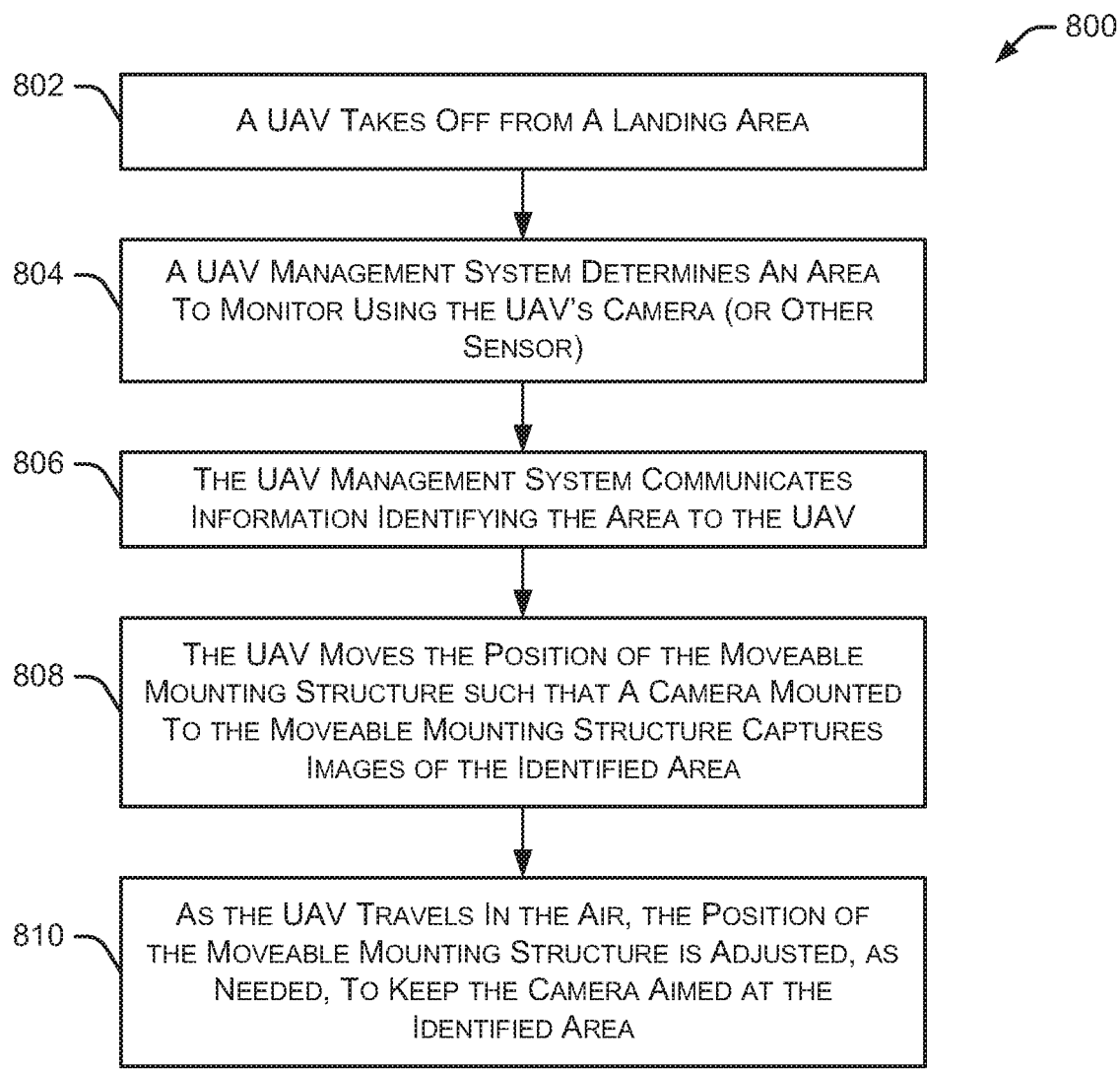
FIG. 8 is a flow diagram illustrating an embodiment of a method for controlling the position of a moveable mounting structure associated with the UAV to monitor a particular area.

FIG. 8 is a flow diagram illustrating an embodiment of a method 800 for controlling the position of a moveable mounting structure associated with the UAV to monitor a particular area. Initially, a UAV takes off 802 from a landing area. A UAV management system determines 804 an area to monitor using the UAV's camera or other sensor. The UAV management system then communicates 806 information identifying the area to monitor to the UAV. The UAV moves 808 the position of the moveable mounting structure such that a camera mounted to the movable mounting structure captures images of the identified area. Additionally, the orientation of the UAV may be adjusted to provide an appropriate field of view for the camera. As the UAV travels through the air, the position of the moveable mounting structure is adjusted 810, as needed, to keep the camera aimed at the identified area.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. An unmanned aerial vehicle (UAV) comprising:
a body component;
a payload area configured to support a payload located on a bottom of the UAV, the bottom of the UAV being below the body component;
a moveable mounting structure comprising a first upturned end and a second upturned end forming a "U" shape, wherein the first upturned end and the second upturned end are each pivotably coupled to the body component so that a first pivot connection and a second pivot connection are formed,
wherein the moveable mounting structure is configured to move between a stowed position and a deployed position when pivoting about the first pivot connection and the second pivot connection, wherein the moveable mounting structure at least partially surrounds and extends below a payload area associated with the UAV while in the deployed position, wherein the stowed position allows access to the bottom of the UAV, and wherein movement of the moveable mounting structure between the stowed position and the deployed position does not interfere with a payload carried by the UAV;
a plurality of legs configured to support the UAV on a landing surface, wherein the plurality of legs create a separation between the moveable mounting structure and the landing surface while the moveable mounting structure is in the deployed position; and
a camera mounted to the moveable mounting structure,
wherein the camera is configured to face downward toward a landing location when the moveable mounting structure is in the deployed position,
and wherein the moveable mounting structure is in the deployed position while the UAV is landing on the landing surface.

2. The UAV of claim 1, wherein the moveable mounting structure moves in an area outside a payload area associated with the UAV.

3. The UAV of claim 2, wherein the payload area associated with the UAV is accessible from below the UAV when the moveable mounting structure is in the stowed position.

4. The UAV of claim 1, wherein a rotational difference between the stowed position and the deployed position is approximately 90 degrees.

5. The UAV of claim 1, further comprising a processor configured to process images captured by the camera.

6. The UAV of claim 1, further comprising a moveable mounting structure controller configured to manage movement of the moveable mounting structure between the stowed position and the deployed position.

7. The UAV of claim 6, wherein the moveable mounting structure controller is further configured to position the moveable mounting structure at a particular location that produces a desired orientation of the camera.

8. The UAV of claim 1, wherein the UAV is further configured to communicate with a UAV management system to control operation of the UAV.

9. The UAV of claim 8, wherein the UAV receives control instructions from the UAV management system, and wherein the control instructions define a desired location of the moveable mounting structure.

10. The UAV of claim 1, wherein the body component is a mounting plate.

11. A method comprising:
moving a moveable mounting structure of an unmanned aerial vehicle (UAV) from a stowed position to a deployed position without interfering with a payload carried by the UAV, the moveable mounting structure comprising a "U" shape between a first upturned end and a second upturned end, wherein the payload is at least partially surrounded by the "U" shape while the moveable mounting structure is in the deployed position;
capturing images of a landing area using a camera mounted to the moveable mounting structure, wherein the camera is configured to face downward toward a landing location when the moveable mounting structure is in the deployed position;
maneuvering the UAV to the landing area based on the captured images so that a plurality of legs configured to support the UAV on a landing surface create a separation between the moveable mounting structure and the landing surface while the moveable mounting structure is in the deployed position; and
moving the moveable mounting structure of the UAV from the deployed position to the stowed position by pivoting about a first pivot connection and a second pivot connection, wherein the moveable mounting structure at least partially surrounds and extends below a payload area associated with the UAV while in the deployed position, wherein the stowed position allows access to a bottom of the UAV, and wherein movement of the moveable mounting structure between the stowed position and the deployed position does not interfere with a payload carried by the UAV.

12. The method of claim 11, wherein a payload area associated with the UAV is accessible from below the UAV when the moveable mounting structure is in the stowed position.

13. The method of claim 11, further comprising moving the moveable mounting structure of the UAV from the stowed position to the deployed position prior to take off from the landing area.

* * * * *